(12) United States Patent
Cogley

(10) Patent No.: US 10,091,981 B1
(45) Date of Patent: Oct. 9, 2018

(54) FLEA DESTRUCTOR SYSTEM

(71) Applicant: Thomas Paul Cogley, Pinellas Park, FL (US)

(72) Inventor: Thomas Paul Cogley, Pinellas Park, FL (US)

( * ) Notice: Subject to any disclaimer, the term of this patent is extended or adjusted under 35 U.S.C. 154(b) by 167 days.

(21) Appl. No.: 14/988,597

(22) Filed: Jan. 5, 2016

Related U.S. Application Data

(63) Continuation-in-part of application No. 14/731,884, filed on Jun. 5, 2015, now Pat. No. 10,021,871.

(51) Int. Cl.
| | |
|---|---|
| *A01M 1/22* | (2006.01) |
| *A01M 1/02* | (2006.01) |
| *A01M 1/06* | (2006.01) |
| *A01M 1/14* | (2006.01) |
| *A01M 1/08* | (2006.01) |
| *A01M 5/08* | (2006.01) |
| *A01M 1/10* | (2006.01) |
| *A01M 5/06* | (2006.01) |

(52) U.S. Cl.
CPC ............ *A01M 1/223* (2013.01); *A01M 1/023* (2013.01); *A01M 1/08* (2013.01); *A01M 1/103* (2013.01); *A01M 1/14* (2013.01); *A01M 1/145* (2013.01); *A01M 5/06* (2013.01); *A01M 5/08* (2013.01)

(58) Field of Classification Search
CPC ............ A01M 5/02; A01M 5/04; A01M 5/06; A01M 1/023; A01M 1/026; A01M 1/04; A01M 1/06; A01M 1/08; A01M 1/14; A01M 1/223; A01M 1/103; A01M 1/145
USPC .................................. 43/139, 140, 113, 114
See application file for complete search history.

(56) References Cited

U.S. PATENT DOCUMENTS

| | | | | |
|---|---|---|---|---|
| 3,968,590 A | * | 7/1976 | Kitterman ............... | A01M 1/02 43/107 |
| 4,037,351 A | * | 7/1977 | Springer ................. | A01M 1/02 43/112 |
| 4,694,604 A | * | 9/1987 | Mitchell ................. | A01M 1/02 43/107 |
| 4,729,147 A | * | 3/1988 | Armbruster ............... | A47L 5/36 15/314 |
| 4,843,752 A | * | 7/1989 | Munemasa ........... | A01M 17/00 43/138 |
| 4,968,487 A | * | 11/1990 | Yamamoto .............. | A01M 1/04 210/504 |
| 5,255,469 A | * | 10/1993 | Sukup ..................... | A01M 5/08 43/140 |
| 5,400,543 A | * | 3/1995 | Ideker, Jr. ............... | A01M 1/06 134/21 |
| 5,806,238 A | * | 9/1998 | Brenner .................. | A01M 3/00 15/339 |
| 5,870,851 A | * | 2/1999 | Shoemaker .......... | A01K 13/002 119/626 |

(Continued)

FOREIGN PATENT DOCUMENTS

| | | | | |
|---|---|---|---|---|
| FR | 2890287 A1 | * | 3/2007 | ............. A01M 5/08 |
| JP | WO-2015145789 A1 | * | 10/2015 | ............ A01M 1/023 |
| WO | WO-9713408 A1 | * | 4/1997 | ............. A01M 5/08 |

*Primary Examiner* — Darren W Ark
*Assistant Examiner* — Morgan T Barlow

(57) ABSTRACT

An attracting assembly is positioned at an upper location to attract fleas. A killing assembly is positioned at an intermediate location beneath the attracting assembly to kill the attracted fleas. A moving assembly is positioned at a lower location beneath the killing assembly for maximizing the number of fleas attracted and killed.

8 Claims, 7 Drawing Sheets

(56) References Cited

U.S. PATENT DOCUMENTS

| | | | | |
|---|---|---|---|---|
| 6,050,025 A * | 4/2000 | Wilbanks | | A01M 1/023 43/112 |
| 6,286,249 B1 * | 9/2001 | Miller | | A01M 1/02 43/113 |
| 6,459,955 B1 * | 10/2002 | Bartsch | | A47L 9/00 318/568.11 |
| 6,568,123 B2 * | 5/2003 | Nelson | | A01M 1/023 43/107 |
| 6,594,944 B2 * | 7/2003 | Chura | | A01M 1/10 43/112 |
| 6,883,201 B2 * | 4/2005 | Jones | | A47L 5/30 15/319 |
| 6,925,752 B1 * | 8/2005 | Cherry | | A01M 1/02 43/107 |
| 7,441,298 B2 * | 10/2008 | Svendsen | | A47L 5/30 15/319 |
| 2001/0047231 A1 * | 11/2001 | Peless | | A01D 34/008 701/23 |
| 2003/0060928 A1 * | 3/2003 | Abramson | | A47L 5/22 700/245 |
| 2003/0208951 A1 * | 11/2003 | Bossier | | A01M 1/02 43/107 |
| 2004/0123512 A1 * | 7/2004 | Spiro | | A01M 1/023 43/139 |
| 2004/0128902 A1 * | 7/2004 | Kollars, Jr. | | A01M 1/023 43/107 |
| 2004/0160199 A1 * | 8/2004 | Morgan | | A01M 1/04 315/312 |
| 2004/0200130 A1 * | 10/2004 | Klein | | A01M 1/14 43/114 |
| 2004/0216367 A1 * | 11/2004 | Klein | | A01M 1/02 43/114 |
| 2004/0237382 A1 * | 12/2004 | Durand | | A01M 1/023 43/139 |
| 2005/0019361 A1 * | 1/2005 | Durand | | A01M 1/02 424/405 |
| 2005/0066570 A1 * | 3/2005 | Mosher, II | | A01M 1/02 43/139 |
| 2006/0080887 A1 * | 4/2006 | Chen | | A01M 1/08 43/113 |
| 2006/0242888 A1 * | 11/2006 | Bedoukian | | A01M 1/06 43/107 |
| 2006/0254124 A1 * | 11/2006 | DeYoreo | | A01M 1/023 43/139 |
| 2006/0260183 A1 * | 11/2006 | Hockaday | | A01M 1/02 43/129 |
| 2007/0157508 A1 * | 7/2007 | Chang | | A01M 1/023 43/139 |
| 2008/0035640 A1 * | 2/2008 | Weber | | B65F 1/16 220/213 |
| 2008/0148624 A1 * | 6/2008 | Borth | | G01N 33/68 43/131 |
| 2008/0168701 A1 * | 7/2008 | Hu | | A01M 1/04 43/107 |
| 2009/0313881 A1 * | 12/2009 | Troutman | | A01K 13/002 43/107 |
| 2010/0037512 A1 * | 2/2010 | Durand | | A01M 1/06 43/139 |
| 2010/0145417 A1 * | 6/2010 | Kaufmann | | A01M 1/2094 607/91 |
| 2010/0186285 A1 * | 7/2010 | Schmitt | | A01M 1/06 43/132.1 |
| 2010/0205767 A1 * | 8/2010 | Lewis | | A01M 3/005 15/339 |
| 2010/0226122 A1 * | 9/2010 | Tsai | | A01M 29/10 362/231 |
| 2011/0154719 A1 * | 6/2011 | Carroll | | A01M 5/06 43/136 |
| 2011/0283597 A1 * | 11/2011 | Coventry | | A01M 1/023 43/107 |
| 2012/0137569 A1 * | 6/2012 | Younts | | A01M 3/005 43/139 |
| 2012/0246998 A1 * | 10/2012 | Vasudeva | | A01M 1/023 43/114 |
| 2013/0014429 A1 * | 1/2013 | Meskouris | | A01M 1/2094 43/139 |
| 2013/0025183 A1 * | 1/2013 | Durand | | A01M 1/02 43/107 |
| 2013/0101654 A1 * | 4/2013 | Mathis | | A01N 59/00 424/405 |
| 2013/0326933 A1 * | 12/2013 | Jung | | A01M 1/04 43/140 |
| 2014/0013655 A1 * | 1/2014 | Southard | | A01M 3/005 43/139 |
| 2014/0137462 A1 * | 5/2014 | Rocha | | A01M 1/08 43/113 |
| 2014/0165452 A1 * | 6/2014 | Rocha | | A01M 1/08 43/113 |
| 2014/0363603 A1 * | 12/2014 | KeiteTelgenbuscher | | C09J 7/0235 428/41.3 |
| 2015/0125504 A1 * | 5/2015 | Ward | | D01D 5/0985 424/411 |
| 2015/0264913 A1 * | 9/2015 | Ganmor | | A01M 5/08 43/139 |
| 2015/0305320 A1 * | 10/2015 | Hedman | | A01M 1/24 43/132.1 |
| 2016/0157496 A1 * | 6/2016 | Nchekwube | | A01N 25/006 424/84 |
| 2016/0183476 A1 * | 6/2016 | Kabakov | | A01G 7/06 239/159 |
| 2016/0377093 A1 * | 12/2016 | Shigemoto | | F04D 29/4226 415/121.2 |
| 2017/0079258 A1 * | 3/2017 | Patel | | A01N 63/02 |
| 2017/0202199 A1 * | 7/2017 | Patel | | A01M 1/023 |

* cited by examiner

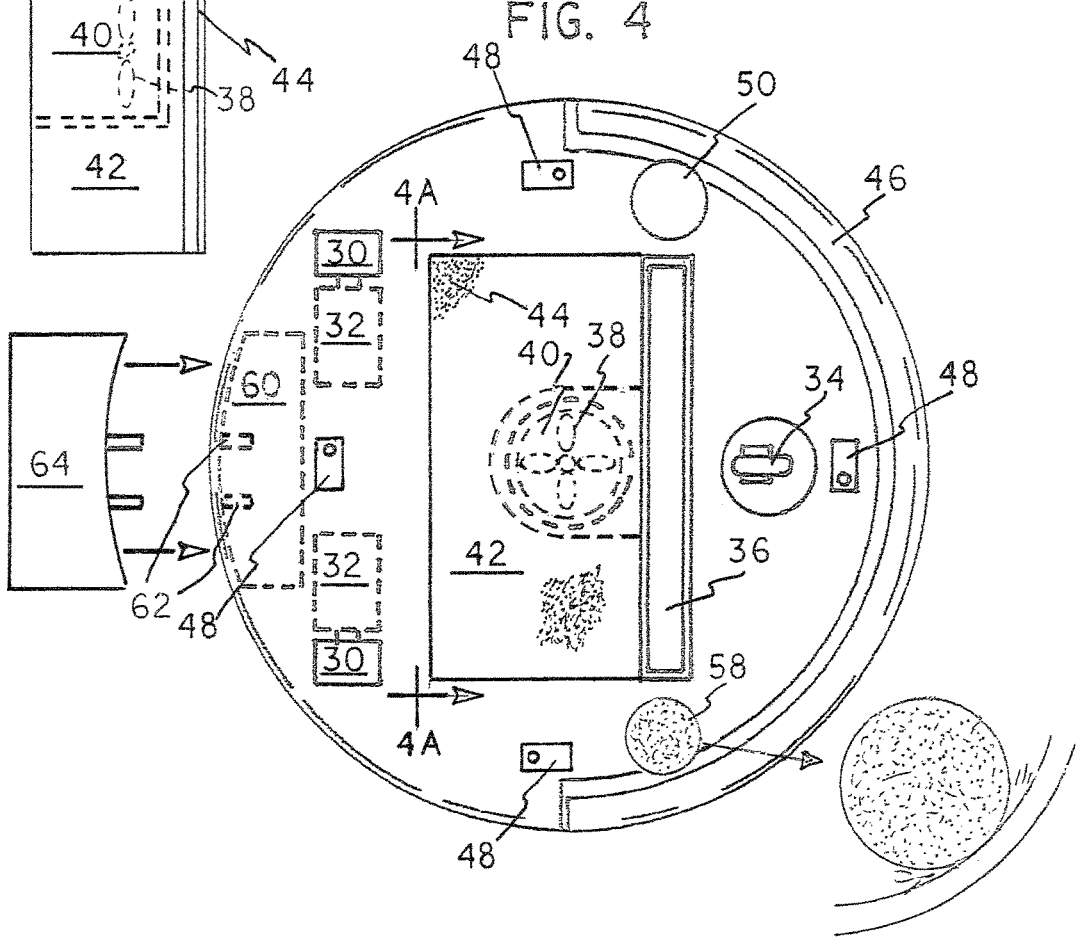

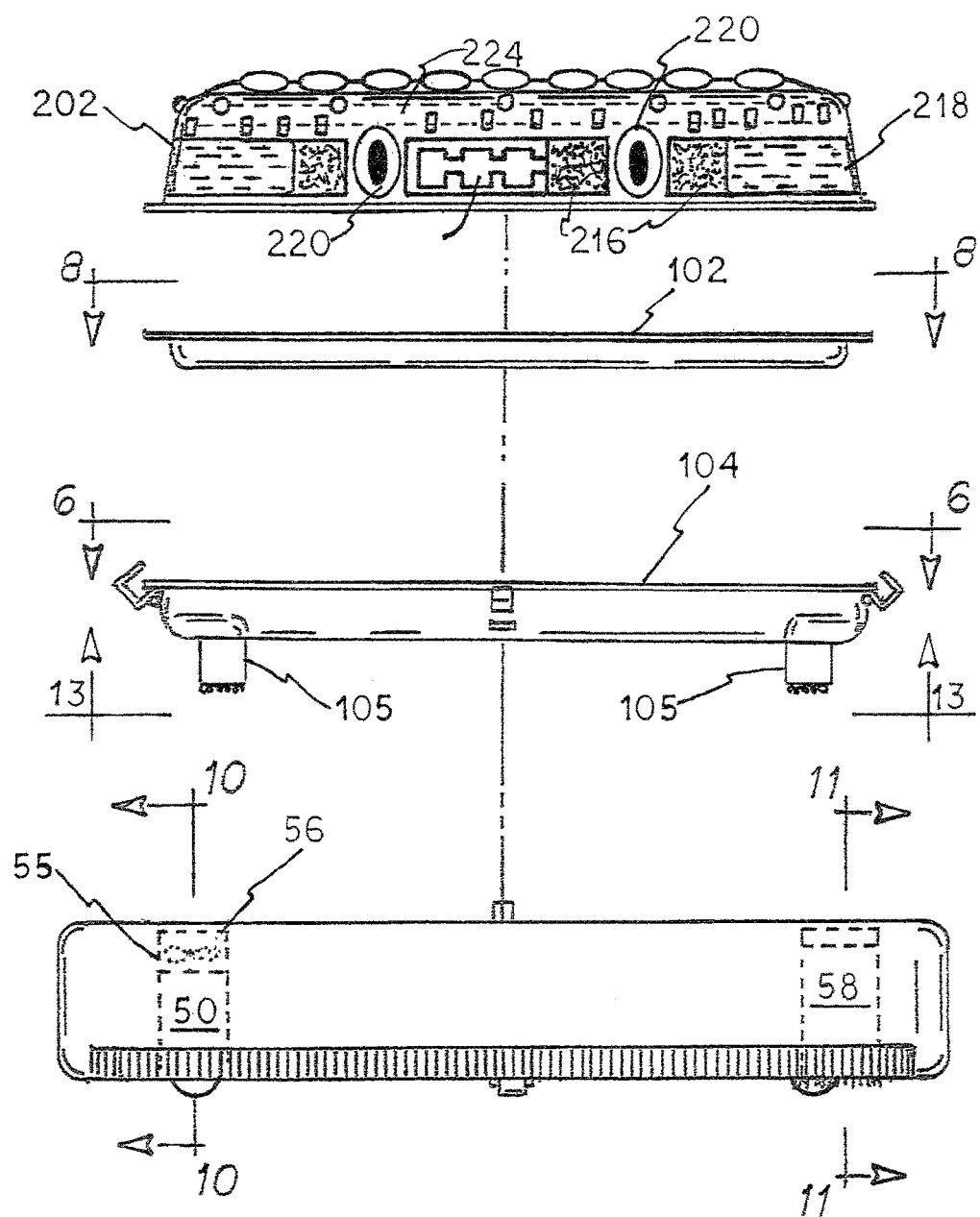

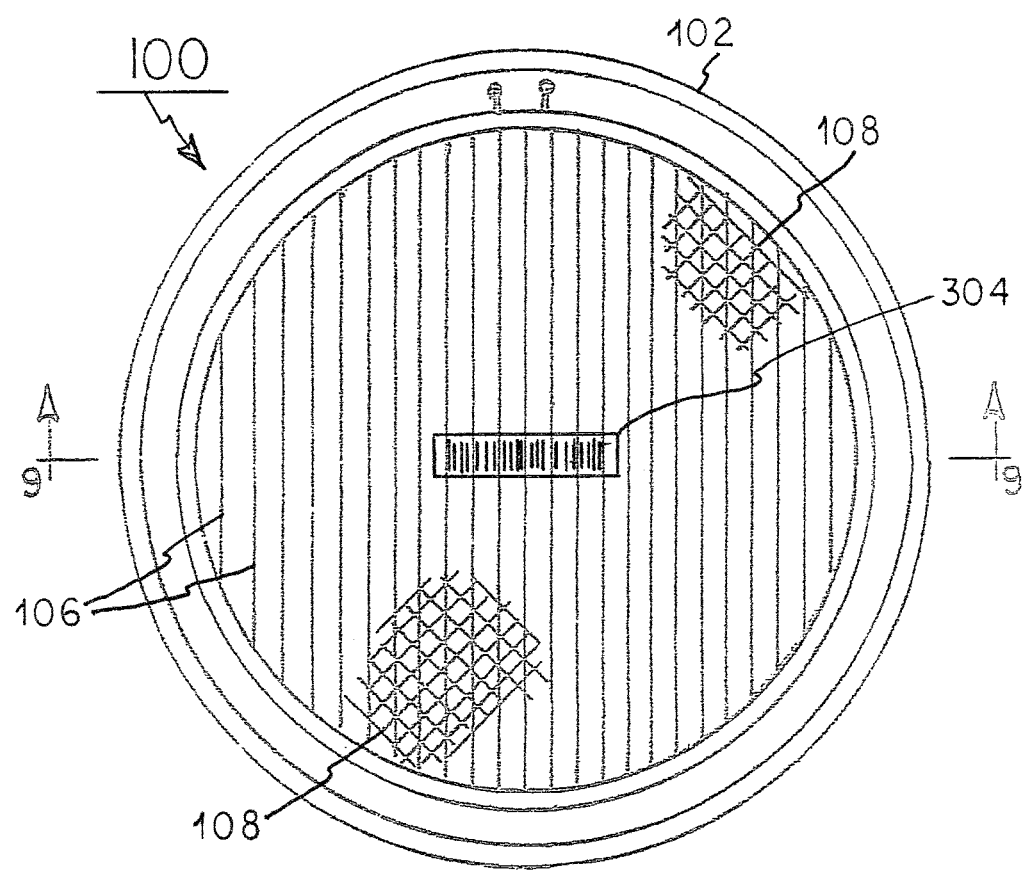
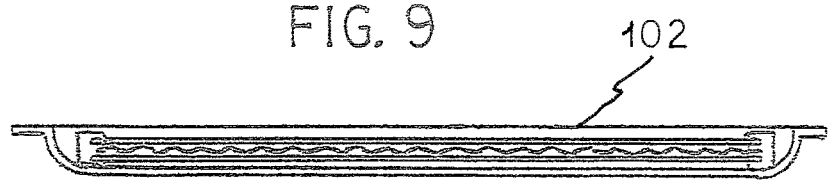

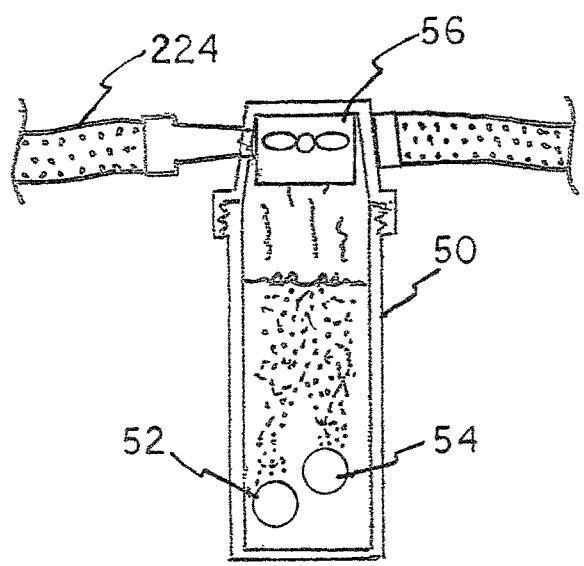
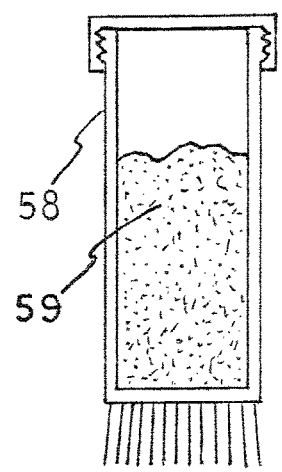
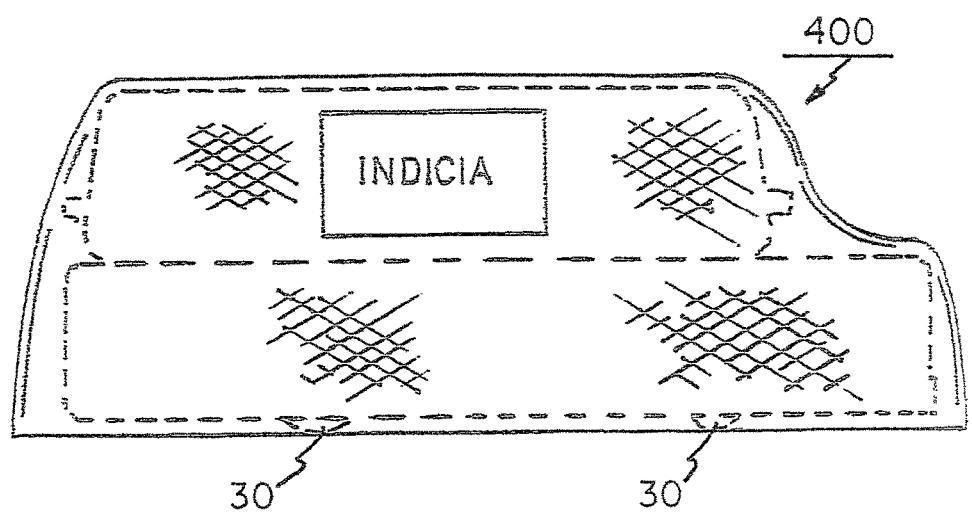

FLEA DESTRUCTOR SYSTEM

RELATED APPLICATION

The present application is a continuation-in-part of pending application Ser. No. 14/731,884 filed Jun. 5, 2015, the subject matter of which application is incorporated herein by reference.

BACKGROUND OF THE INVENTION

Field of the Invention

The present invention relates to a flea destructor system and more particularly pertains to attracting fleas, for killing attracted fleas, and for moving to maximize fleas attracted and killed, the attracting and killing and moving being done in a safe, ecological, convenient, and economical manner.

SUMMARY OF THE INVENTION

In view of the foregoing disadvantages inherent in the known types of insect eliminating devices now present in the prior art, the present invention provides an improved flea destructor system. As such, the general purpose of the present invention, which will be described subsequently in greater detail, is to provide a new and improved flea destructor system and method which has all the advantages of the prior art and none of the disadvantages.

From a broad viewpoint, the present invention is a flea destructor system. An attracting assembly is positioned at an upper location to attract fleas. A killing assembly is positioned at an intermediate location beneath the attracting assembly to kill the attracted fleas. A moving assembly is positioned at a lower location beneath the killing assembly. In this manner, the number of fleas attracted and killed is maximized. The killing assembly and the attracting assembly as a unit may removably fit upon many types of moving assemblies of various shapes and makes by a set of connectors thereby creating two independent power and working sub-systems.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved flea destructor system which has all of the advantages of the prior art insect eliminating devices and none of the disadvantages.

It is another object of the present invention to provide a new and improved flea destructor system which may be easily and efficiently manufactured and marketed and set upon the vast majority of robotic vacuums.

It is a further object of the present invention to provide a new and improved flea destructor system which is of durable and reliable constructions.

An even further object of the present invention is to provide a new and improved flea destructor system which is susceptible of a low cost of manufacture with regard to both materials and labor, and which accordingly is then susceptible of low prices of sale to the consuming public, thereby making such flea destructor system economically available to the buying public.

Lastly, another object of the present invention is to provide a flea destructor system for attracting fleas, for killing attracted fleas, and for moving to maximize fleas attracted and killed, the attracting and killing and moving being done in a safe, ecological, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a left side elevational view of the system.

FIG. 4 is a bottom view of the system taken along line 4-4 of FIG. 1.

FIG. 4A is a left side view taken along line 4A of FIG. 4.

FIG. 5 an exploded front elevational view of the system.

FIG. 8 is a plan view of the system taken along line 8-8 of FIG. 5.

FIG. 9 is a cross sectional view taken along line 9-9 of FIG. 8.

FIG. 10 is a cross sectional view of the fluid canister of the prior Figures.

FIG. 11 is a cross sectional view of the diatomaceous earth canister of the prior Figures.

FIG. 12 is a side elevational view of shroud for covering the system when not in use.

The same reference numerals refer to the same parts throughout the various Figures.

DESCRIPTION OF THE PREFERRED EMBODIMENT

Figure 1:
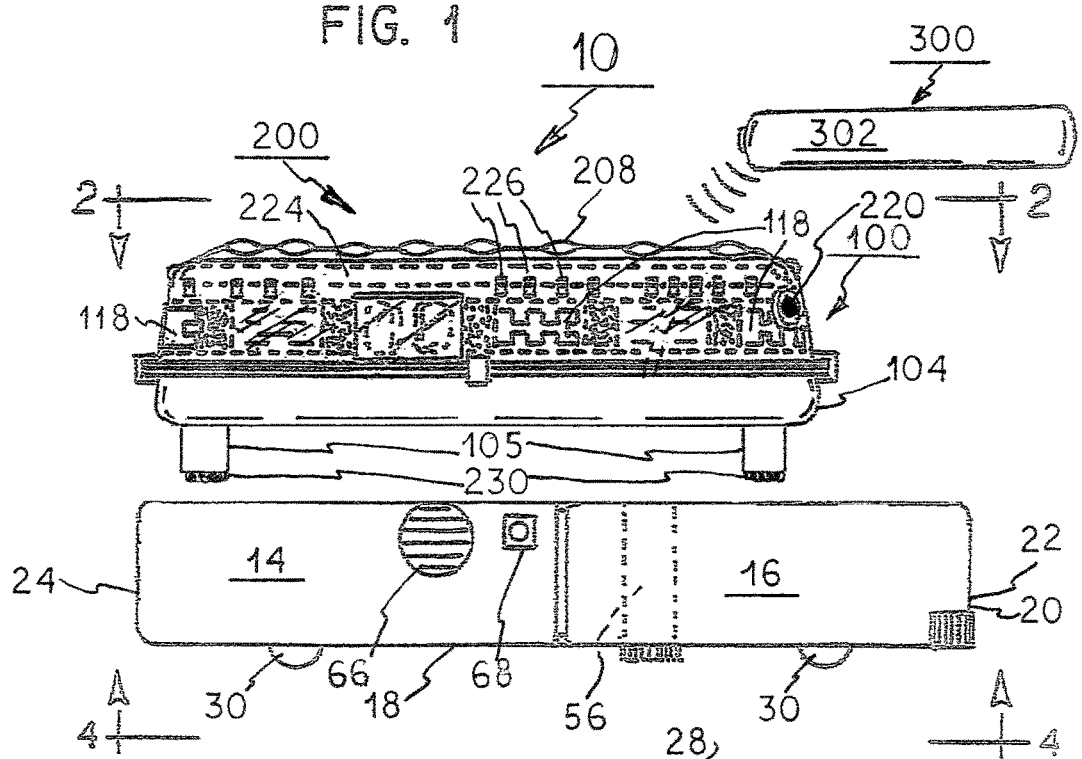
FIG. 1 is an exploded right side elevational view of a flea destructor system constructed in accordance with the principles of the present invention.
Figure 2:
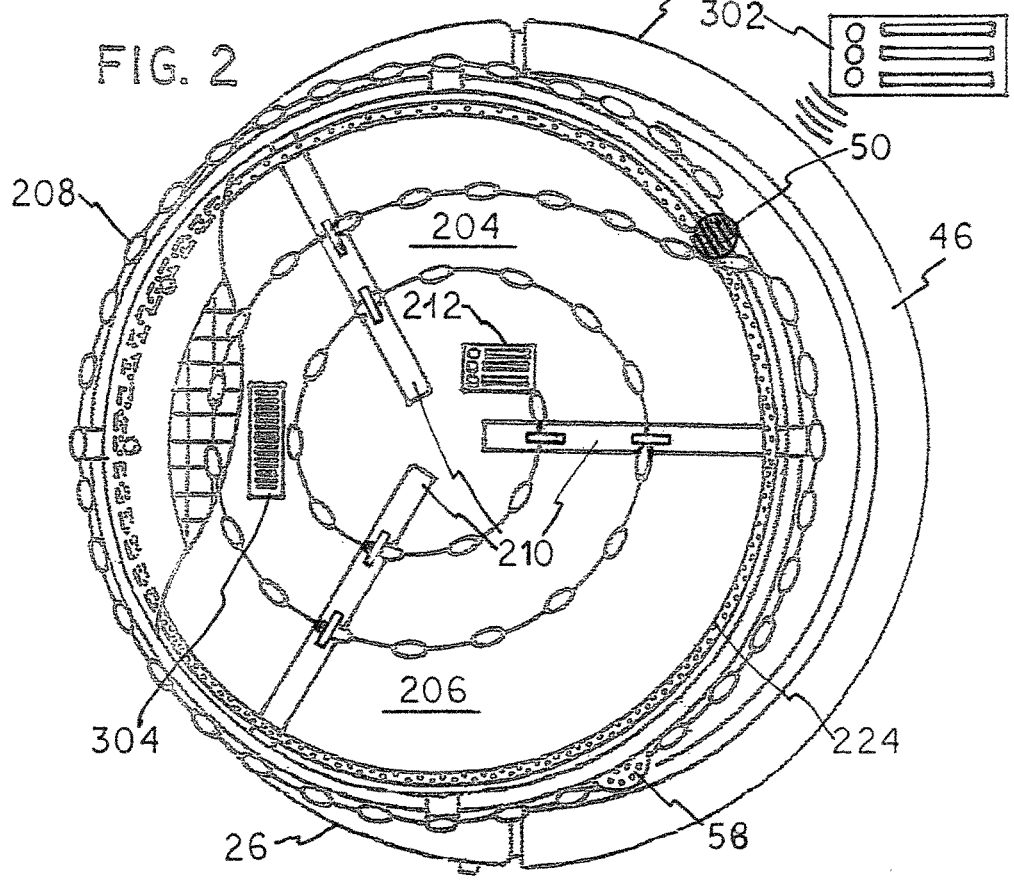
FIG. 2 is a plan view of the system taken along line 2-2 of FIG. 1.
Figure 6:
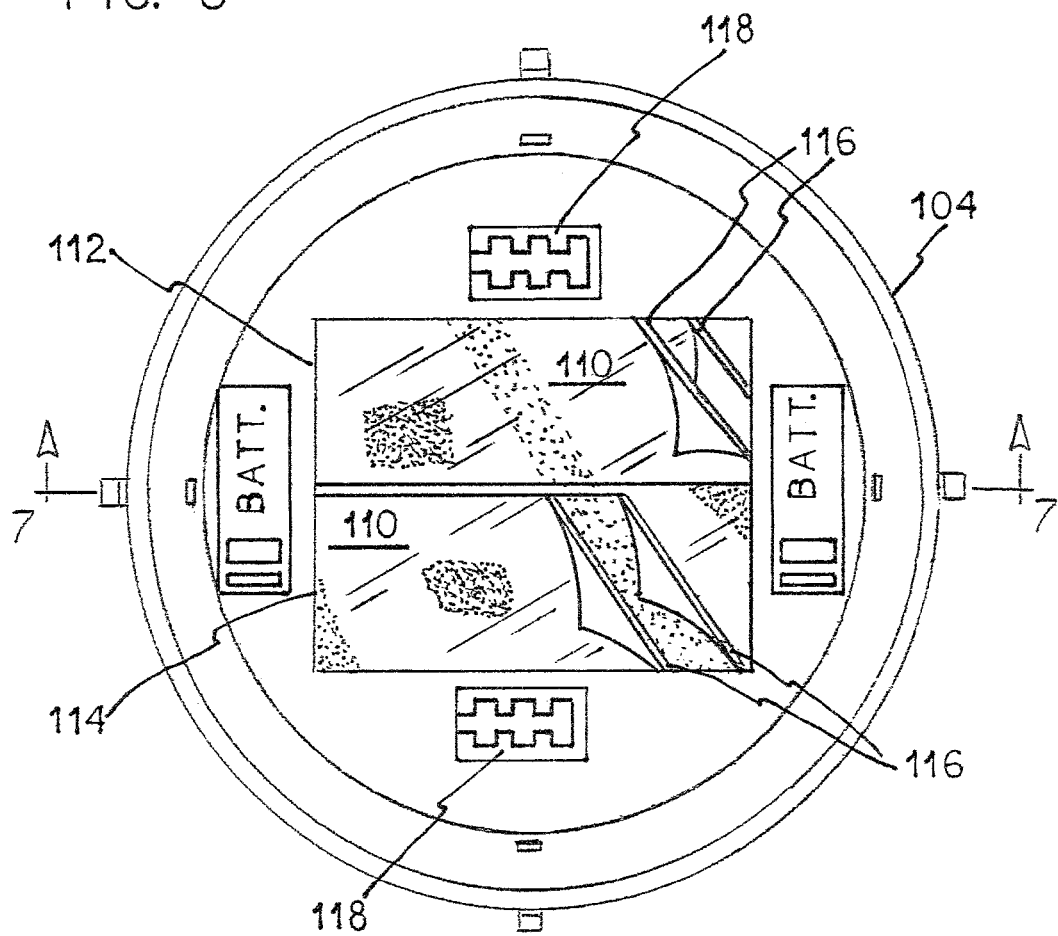
FIG. 6 is a plan view of the system taken along line 6-6 of FIG. 5.
Figure 7:
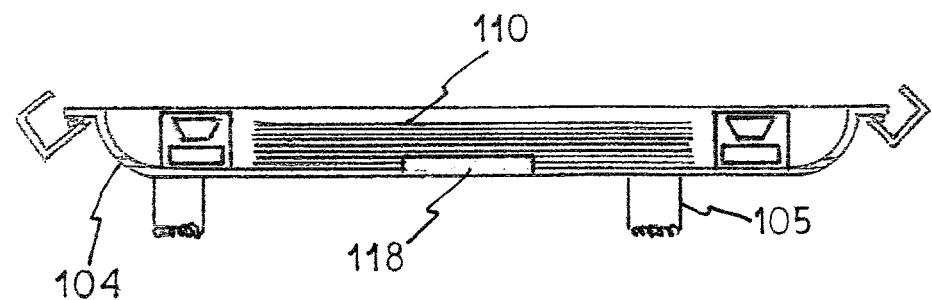
FIG. 7 is a cross sectional view taken along line 7-7 of FIG. 6.

With reference now to the drawings, and in particular to FIG. 1 thereof, the preferred embodiment of the new and improved flea destructor system embodying the principles and concepts of the present invention and generally designated by the reference numeral 10 will be described.

The present invention, the flea destructor system 10 is comprised of a plurality of components. Such components in their broadest context include an attracting assembly, a killing assembly, and a moving assembly. Such components are individually configured and correlated with respect to each other so as to attain the desired objective.

From a specific viewpoint the present invention is a flea destructor system. First provided is a moving assembly 14. The moving assembly has a base 16. The base has a circular floor 18 and a cylindrical side wall 20 forming a lower chamber. The base has a forward region 22, a rearward region 24, a left side region 26, and a right side region 28. The moving assembly includes two drive wheels 30. The drive wheels depend from the floor adjacent to the rearward region. The moving assembly includes two drive motors 32. The drive motors power the drive wheels respectively. The moving assembly includes a caster wheel 34. The caster wheel depends from the floor adjacent to the forward region. The caster wheel is pivotable about a vertical axis to change the direction of movement of the base and the system. The moving assembly includes a slot 36. The slot extends transversely through the floor. The moving assembly includes a central fan 38. The central fan has a central fan motor 40. The central fan is mounted centrally on the floor rearwardly of the slot. The moving assembly includes a container 42. The container collects the fleas and debris passing upward through the slot are collected. The container includes a filter 44. The filter is impregnated with an insecticide. The central fan functions to create a vacuum. The vacuum draws up the fleas and debris into the container for disposal. The moving system includes a semi-circular bumper 46. The semi-circular bumper is recessed in the forward region. The semi-circular bumper extends to the left and right side regions, respectively. The semi-circular bumper is moved upon contact with a wall. In this manner rotation of the wheels is reversed. Further in this manner the direction of motion of the system is changed. The moving assembly includes a plurality of sensors 48. The sensors are mounted to the floor. In this manner the rotation of the wheels is reversed. Further in this manner tumbling down steps is abated.

The moving assembly also includes a fluid canister 50. The fluid canister contains water, a yeast pill 52, and a sugar pill 54 functioning to create carbon dioxide and attract fleas. Such pills may be formed in the shape of the fleas to be attracted and killed. The moving assembly includes a first motor 55 and a first fan 56 functioning to evacuate carbon dioxide from the fluid canister to attract fleas. The fluid canister is adapted to be replaced with a pressurized container of carbon dioxide and positioned at any of a plurality of locations in the system remote from or within the moving assembly. The moving assembly includes a particulate canister 58. The particulate canister includes diatomaceous earth 59. The particulate canister dispenses the diatomaceous earth to kill flea eggs, larvae, and pupae when the bumper hits a wall. The moving assembly has a battery pack 60 within the chamber with nodes 62 adjacent to the rearward region. The moving assembly includes a charger 64. The charger functions to receive the nodes and recharge the battery pack. The moving assembly includes a microphone 66. The microphone is positioned in the cylindrical side wall of the base to provide verbal messages. A button 68 is provided to power the microphone and initiate a verbal message.

A killing assembly 100 is next provided. The killing assembly includes an upper dish 102 and a lower dish 104. The upper dish has parallel electrically charged wires 106. The wires function to kill fleas coming into contact with the wires. The upper dish has a grid 108 of un-charged wires. The un-charged wires are spaced above the electrically charged wires. In this manner human contact with the electrically charged wires is abated. The electrically charged wires are optional. The killing assembly includes a plurality of adhesive sheets 110. The adhesive sheets are supported in two stacks 112, 114 laterally spaced in the lower dish to receive and retain fleas killed by the electrically charged wires. Each stack includes the adhesive sheets with adhesive sheets 116 between the adhesive sheets. A plurality of heating elements 118 are provided in the lower dish functioning to attract fleas.

Next, an attracting assembly 200 is provided for attracting fleas to be killed. The attracting assembly has a circumferential side wall 202, an open top 204, and a closed bottom 206. The attracting assembly includes a string of light emitting diodes 208. The attracting assembly includes a plurality of supports 210 with clips retaining the light emitting diodes in a spiral configuration. The string of light emitting diodes has an exterior end coupled to the battery pack. The string of light emitting diodes has an interior end. The interior end has a user-operated control pad 212.

The attracting assembly includes peripheral components. The peripheral components are on the exterior surface of the attracting assembly. The peripheral components include heating elements 118, synthetic fur 216, adhesive patches 218, and indicia in the form of eye balls 220 creating the appearance of a creature. The eye balls are preferably formed of florescent material to attract fleas to be killed.

The attracting assembly includes a tube 224. The tube is circular in configuration. The tube is secured within the attracting assembly. Apertures are provided along the length of the tube. The tube has a free end operatively coupled to the fluid canister for creating a cloud of carbon dioxide. Square holes 226 are located peripherally through the attracting assembly to create a cloud around the system and in proximity thereto for attracting fleas to be killed.

Three downwardly extending legs 105 with downwardly facing hook and loop surfaces are removably received in three associated recesses with upwardly facing hook and loop fasteners. Such legs 105 and recesses allow for proper positioning and removable securement between the moving assembly and the killing assembly. As an alternate embodiment, three upper magnets 230 on the killing assembly and three associated lower magnets 231 on the moving assembly function together to removably couple the killing assembly to the moving assembly. Upper clips 232 are provided on the killing assembly. The upper clips couple the attracting assembly to the killing assembly. The killing assembly and the attracting assembly are adapted to be integrally fabricated as an upper sub-assembly. The upper sub-assembly is removably coupled to the moving assembly as disclosed herein. In the alternative, the upper sub-assembly may be removably coupled to any of most commercially available robotic vacuums.

Next, a control assembly 300 is provided. The control assembly includes a remote device 302 for providing using control of the system. The control assembly also functions to drive the system along a wall or hit the bumper for dispensing diatomaceous earth. The control assembly also includes a user visible digital UPC, universal product code, 304. The control assembly includes a battery power percentage indicator 306. The battery power percentage indicator has an ON/OFF button 308 and a CLAP ON/CLAP OFF switch.

Figure 13:
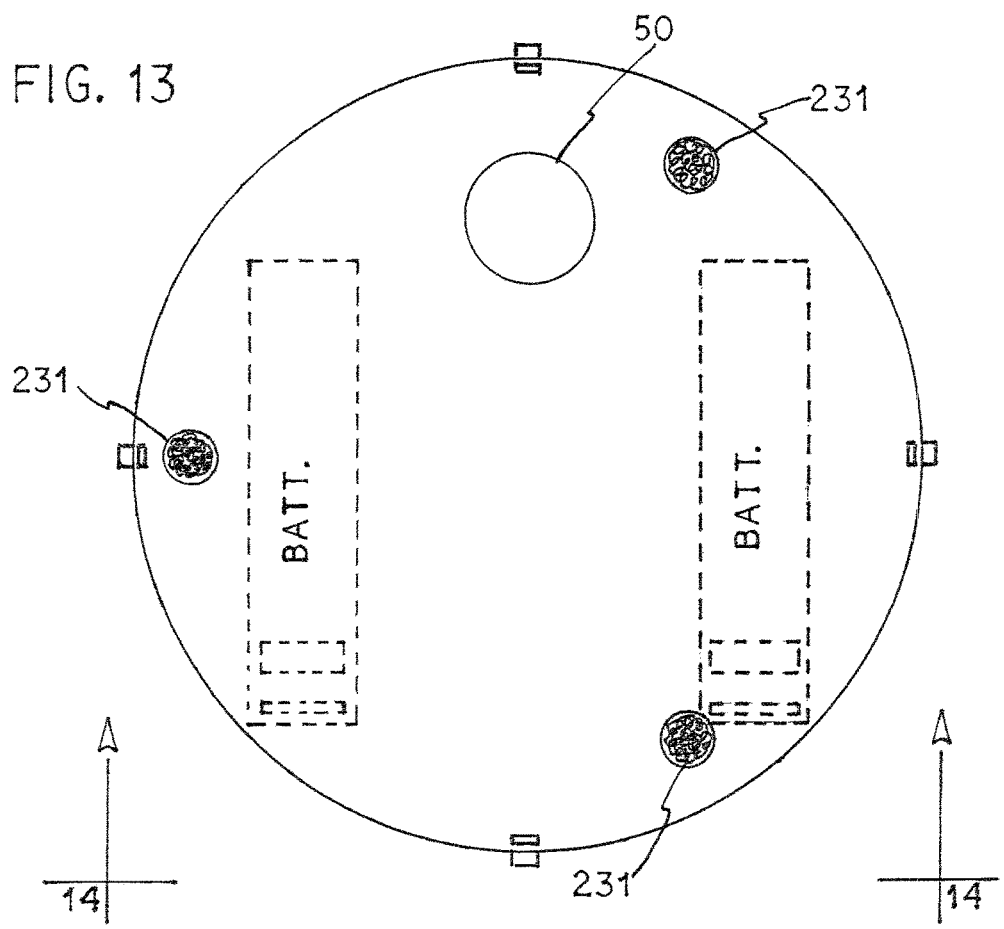
FIG. 13 is a bottom view of the bottom plate taken along line 13-13 of FIG. 9.
Figure 14:
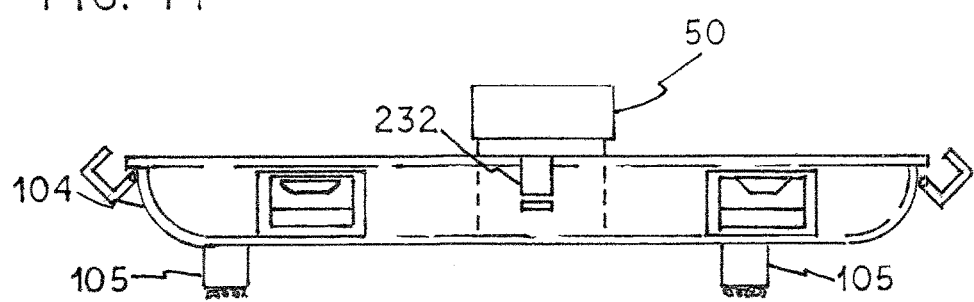
FIG. 14 is a front elevational view taken long line 14-14 of FIG. 13.

Lastly, as illustrated in FIG. 13, a shroud 400 is provided for covering the system when the system is not in use. The shroud is preferably impregnated with a natural insecticide.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A flea destructor system comprising:
  a flea attracting assembly to attract fleas;
  a killing assembly at a location entirely beneath the flea attracting assembly, the killing assembly structurally and operatively coupled to the flea attracting assembly and adapted to kill the fleas attracted by the flea attracting assembly; and
  an entirely self-propelled moving assembly at a location entirely beneath the killing assembly, the moving assembly structurally and operatively coupled to the killing assembly and the flea attracting assembly, the moving assembly (14) comprising:
    a base (16) with a circular floor (18), and a cylindrical side wall (20) comprising a lower chamber, the base comprising:
      a forward region (22),
      a rearward region (24),
      a left side region
      a right side region (28),
      two drive wheels (30) depending from the floor adjacent to the rearward region,
      two drive motors (32) powering the two drive wheels respectively,
      a caster wheel (34) depending from the floor adjacent to the forward region, the caster wheel being pivotable about a vertical axis,
      a slot (36) extending transversely through the floor,
      a central fan (38) with a central fan motor (40) mounted centrally on the floor rearwardly of the slot,
      a container (42) adapted to collect fleas and debris passing upwardly through the slot, the container comprising:
        a filter (44) impregnated with an insecticide,
        the central fan functioning to create a vacuum drawing up the fleas and debris into the container for disposal,
      a semi-circular bumper (46) recessed in the forward region and extending to the left and right side regions respectively, the semi-circular bumper being moved upon contact with a wall to reverse the rotation of the wheels and change the direction of motion of the system,
      a plurality of sensors (48) mounted to the floor to reverse the rotation of the wheels and abate tumbling down steps,
      a fluid canister (50) for creating a cloud of carbon dioxide to attract fleas,
      a fluid motor (55) with a first fan (56) function to evacuate the carbon dioxide from the fluid canister to attract fleas,
      a particulate canister (58) with diatomaceous earth functioning to dispense the diatomaceous earth and kill flea eggs, larvae, and pupae,
      a battery pack (60) within the chamber with nodes (62) adjacent to the rearward region,
      a charger (64) functioning to receive the nodes and recharge the battery pack,
      a speaker (66) in the side wall of the base to provide verbal messages, and
      a button (68) for powering the speaker and initiating a verbal message.

2. The system as set forth in claim 1 and further comprising:
  a control assembly (300) comprising a remote device (302) providing user control to the system.

3. A flea destructor system comprising:
  a flea attracting assembly adapted to attract fleas;
  a killing assembly (100) at a location entirely beneath the flea attracting assembly, the killing assembly structurally and operatively coupled to the flea attracting assembly and adapted to kill the fleas attracted by the flea attracting assembly, the killing assembly comprising:
    an upper dish (102),
    a lower dish (104),
      a plurality of adhesive sheets (110) supported in two stacks (112), (114) laterally spaced in the lower dish to receive and retain fleas, the two stacks each comprising:
        the adhesive sheets with adhesive sheets (116) between the adhesive sheets, and
        a plurality of heating elements (118) in the lower dish functioning to attract fleas; and
  an entirely self-propelled moving assembly at a location entirely beneath the killing assembly, the moving assembly structurally and operatively coupled to the killing assembly and the flea attracting assembly.

4. The system as set forth in claim 3 and further comprising:
  parallel electrically charged wires (106) in the upper dish functioning to kill fleas coming into contact therewith, and
  a grid (108) of un-charged wires spaced above the electrically charged wires to abate human contact with the electrically charged wires.

5. A flea destructor system comprising:
a flea attracting assembly (200);
a killing assembly at a location entirely beneath the flea attracting assembly, the killing assembly structurally and operatively coupled to the flea attracting assembly and adapted to kill the fleas attracted by the flea attracting assembly; and
an entirely self-propelled moving assembly at a location entirely beneath the killing assembly, the moving assembly structurally and operatively coupled to the killing assembly and the flea attracting assembly,
the flea attracting assembly comprising:
- a circumferential side wall (202) with an open top (204) and a closed bottom (206),
- a string of light emitting diodes (208) comprising:
  - an exterior end coupled to a battery pack;
  - an interior end with a user-operated control pad (212), and
  - a plurality of supports (210) with clips retaining the string of light emitting diodes in a spiral configuration,
- peripheral components on the exterior surface of the flea attracting assembly comprising:
  - heating elements (118),
  - synthetic fur (216),
  - adhesive patches (218), and
  - indicia in the form of eye balls (220) providing an appearance of a creature to the system, and
- a tube (224) in a circular configuration secured within the flea attracting assembly, the tube having apertures (226) along the length thereof with a free end,
- a fluid canister operatively coupled to the free end adapted to create a cloud of carbon dioxide, the apertures (226) located peripherally through the flea attracting assembly act adapted to create a cloud around the system and in proximity thereto for attracting fleas to be killed, and
- three upper components (230),
- three associated lower components (231) removably receiving the three upper components,
- upper clips (232) on the killing assembly coupling the flea attracting assembly to the killing assembly.

6. The system as set forth in claim 5 wherein the three upward components are three downwardly extending legs (105) with downwardly facing hook and loop surfaces; and the three associated downward components are three associated recesses with upwardly facing hook and loop fasteners removably receiving the three downwardly extending legs.

7. A flea destructor system (10) configured for attracting fleas, for killing fleas, and for moving to maximize fleas attracted and killed, the attracting and killing and moving being done in a safe, ecological, convenient, and economical manner, the system comprising, in combination:
a moving assembly (14) comprising:
- a base (16) with a circular floor (18); and a cylindrical side wall (20) comprising a lower chamber, the base comprising:
  - a forward region (22),
  - a rearward region (24),
  - a left side region
  - a right side region (28),
  - two drive wheels (30) depending from the floor adjacent to the rearward region,
  - two drive motors (32) powering the two drive wheels respectively,
  - a caster wheel (34) depending from the floor adjacent to the forward region, the caster wheel being pivotable about a vertical axis to change a direction of movement of the base and the system,
  - a slot (36) extending transversely through the floor,
  - a central fan (38) with a central fan motor (40) mounted centrally on the floor rearwardly of the slot,
  - a container (42) adapted to collect fleas and debris passing upwardly through the slot, the container comprising:
    - a filter (44) impregnated with an insecticide,
    - the central fan functioning to create a vacuum drawing up the fleas and debris into the container for disposal,
  - a semi-circular bumper (46) recessed in the forward region and extending to the left and right side regions respectively, the semi-circular bumper being moved upon contact with a wall to reverse the rotation of the wheels and change the direction of motion of the system,
  - a plurality of sensors (48) mounted to the floor to reverse the rotation of the wheels and abate tumbling down steps,
  - a first motor (55) to power a first fan (56) which functions to evacuate the carbon dioxide from the fluid canister to attract fleas,
  - a particulate canister (58) with a natural flea killer (59) functioning to dispense the natural flea killer to kill flea eggs, larvae, and pupae,
  - a battery pack (60) within the chamber with nodes (62) adjacent to the rearward region,
  - a charger (64) functioning to receive the nodes and recharge the battery pack,
  - a speaker (66) in the side wall of the base to provide verbal messages, and
  - a button (68) for powering the speaker and initiating a verbal message;
a killing assembly (100) structurally and operatively coupled to the moving assembly, the killing assembly comprising:
- upper dish (102), comprising:
  - parallel electrically charged wires (106) functioning to kill fleas coming into contact therewith,
  - a grid (108) of un-charged wires spaced above the electrically charged wires to abate human contact with the electrically charged wires, and
- a lower dish (104);
- a plurality of adhesive sheets (110) supported in two stacks (112), (114) laterally spaced in the lower dish to receive and retain fleas killed by the electrically charged wires, the two stacks each comprising the adhesive sheets with adhesive sheets (116) between the adhesive sheets, and
- a plurality of heating elements (118) in the lower dish functioning to attract fleas;
a flea attracting assembly (200) for attracting fleas to be killed, the flea attracting assembly structurally and operatively coupled to the moving assembly and the killing assembly, the flea attracting assembly comprising:
- a circumferential side wall (202) with an open top (204) and a closed bottom (206),
- a string of light emitting diodes (208) comprising:
  - an exterior end coupled to a battery pack;
  - an interior end with a user-operated control pad (212), and a plurality of supports (210) with clips retaining the string of light emitting diodes in a spiral configuration,
peripheral components on the exterior surface of the flea attracting assembly comprising:
heating elements (118),
synthetic fur (216),
adhesive patches (218), and
indicia in the form of eye balls (220) providing an appearance of a creature to the system, the eye balls being made from a fluorescent material to attract fleas,
a tube (224) in a circular configuration structurally and operatively secured within the flea attracting assembly, the tube having apertures (226) along the length thereof with a free end;
a fluid canister operatively coupled to the free end for creating a cloud of carbon dioxide, the apertures (226) located peripherally through the flea attracting assembly adapted to create a cloud around the system and in proximity thereto for attracting fleas to be killed,
three downwardly extending legs (105) with downwardly facing hook and loop surfaces,
three associated recesses with upwardly facing hook and loop fasteners removably receiving the three downwardly extending legs (105),
upper clips (232) on the killing assembly adapted to couple the flea attracting assembly to the killing assembly; and
a control assembly (300) structurally and operatively, coupled to the flea attracting assembly and the moving assembly and the killing assembly, the control assembly comprising:
a remote device (302) providing user control to the system, the control assembly also functioning to reverse the rotation of the drive wheels and to dispense the natural flea killer independent of the bumper and the sensors,
a user visible digital UPC code (304); and
a battery power percentage indicator (306) comprising:
an ON/OFF button (308) and,
a sound actuated switch; and
a shroud (400) for covering the system when the system is not in use, the shroud being impregnated with an insecticide.

8. The system as set forth in claim 5 wherein the three upper components are three upper magnets (230); and the three associated lower components (231) are three lower magnets for coupling the killing assembly to the moving assembly.

* * * * *